(12) United States Patent
Summerville et al.

(10) Patent No.: US 10,424,105 B2
(45) Date of Patent: Sep. 24, 2019

(54) EFFICIENT AIRBORNE OBLIQUE IMAGE COLLECTION

(71) Applicants: James Summerville, Franklin, TN (US); James Kain, Santa Rosa Beach, FL (US)

(72) Inventors: James Summerville, Franklin, TN (US); James Kain, Santa Rosa Beach, FL (US)

( * ) Notice: Subject to any disclaimer, the term of this patent is extended or adjusted under 35 U.S.C. 154(b) by 516 days.

(21) Appl. No.: 15/067,609

(22) Filed: Mar. 11, 2016

(65) Prior Publication Data

US 2018/0053336 A1 Feb. 22, 2018

Related U.S. Application Data

(60) Provisional application No. 62/131,657, filed on Mar. 11, 2015.

(51) Int. Cl.
*G01S 5/00* (2006.01)
*G06K 9/00* (2006.01)
(Continued)

(52) U.S. Cl.
CPC ............ *G06T 15/205* (2013.01); *G01C 11/02* (2013.01); *G01S 5/0009* (2013.01); *G03B 15/006* (2013.01); *G06K 9/0063* (2013.01); *G06T 15/005* (2013.01); *G06T 15/04* (2013.01); *G06T 17/05* (2013.01); *G08G 5/0047* (2013.01);
(Continued)

(58) Field of Classification Search
CPC combination set(s) only.
See application file for complete search history.

(56) References Cited

U.S. PATENT DOCUMENTS 4,021,009 A * 5/1977 Baker .................. G05D 1/0607
244/180
4,086,841 A * 5/1978 MacDonald ............. B64D 1/04
235/401
(Continued)

OTHER PUBLICATIONS

Branco, Kalinka, Pelizzoni, Jorge et al., Tiriba—A New Model Approach of UAV based on Model Driven Development and Multiprocessors, IEEE, ICRA Communications, 978-1-61284-380-3/11/$26.00 © 2011 IEEE (https://ieeexplore.ieee.org/stamp/stamp.jsp?tp=&arnumber=5980581) (2011).*

*Primary Examiner* — Jean Paul Cass

(57) ABSTRACT

A system and method for airborne oblique image collection provides a dense diversity of view aspects of a subtended scene. An onboard camera of an aircraft collects a highly overlapped set of oblique images that are well suited for preparing three dimensional meshes that model complex scenes with significant vertical relief. The aircraft is flown in a radial trajectory over a targeted observable area in order to collect the images. The radial trajectory is optimized using parameters including an altitude, a field-of-view angle, an aft edge angle, and a forward edge angle of the onboard camera, as well as an expected velocity of the aircraft. A flight management system is also employed, wherein the flight management system computes a predicted location for the aircraft using location data and a current velocity of the aircraft. The predicted location being compared to an expected location, ensuring proper navigation of the radial trajectory.

10 Claims, 11 Drawing Sheets

(51) Int. Cl.
*G08G 5/00* (2006.01)
*G01C 11/02* (2006.01)
*G01C 21/00* (2006.01)
*G03B 15/00* (2006.01)
*G06T 15/00* (2011.01)
*G06T 15/04* (2011.01)
*G06T 15/20* (2011.01)
*G06T 17/05* (2011.01)

(52) U.S. Cl.
CPC ............ *G01C 21/00* (2013.01); *G08G 5/0021* (2013.01); *G08G 5/0052* (2013.01)

(56) References Cited

U.S. PATENT DOCUMENTS

| | | | | |
|---|---|---|---|---|
| 4,499,490 A * | 2/1985 | Morgan | ............... | H04N 5/2259 348/335 |
| 4,665,795 A * | 5/1987 | Carbonneau | ............ | F41G 3/323 356/139.08 |
| 5,266,781 A * | 11/1993 | Warwick | ................... | B07C 1/00 235/375 |
| 5,435,503 A * | 7/1995 | Johnson, Jr. | ............ | F41G 7/008 244/3.15 |
| 5,809,311 A * | 9/1998 | Jones | ........................ | G06F 1/30 361/90 |
| 5,883,719 A * | 3/1999 | Coope | .................... | F41G 3/323 356/152.1 |
| 8,121,618 B2 * | 2/2012 | Rhoads | ................. | G01C 21/20 455/456.1 |
| 8,699,235 B2 * | 4/2014 | Soufan | .................... | H04M 1/19 361/800 |
| 9,019,375 B1 * | 4/2015 | Whelan | ................. | G01C 23/00 348/117 |
| 9,336,768 B2 * | 5/2016 | Soufan | .................... | H04M 1/19 |
| 9,389,298 B2 * | 7/2016 | Smitherman | .......... | G01C 11/02 |
| 9,609,288 B1 * | 3/2017 | Richman | ............... | H04N 7/183 |
| 9,725,172 B2 * | 8/2017 | Warsop | ................ | F42B 12/365 |
| 9,776,709 B2 * | 10/2017 | Miralles | .................... | G05D 1/12 |
| 2003/0093187 A1 * | 5/2003 | Walker | .................... | B64C 13/20 701/1 |
| 2005/0004723 A1 * | 1/2005 | Duggan | ............... | G05D 1/0061 701/24 |
| 2010/0076600 A1 * | 3/2010 | Cross | ..................... | H04W 4/70 700/259 |
| 2010/0084513 A1 * | 4/2010 | Gariepy | ............... | B64C 39/024 244/190 |
| 2011/0139923 A1 * | 6/2011 | Papanikolopoulos | ....................... | A63H 27/12 244/2 |
| 2011/0288684 A1 * | 11/2011 | Farlow | ................... | B25J 11/009 700/264 |
| 2012/0053805 A1 * | 3/2012 | Dantu | .................. | B60W 40/09 701/70 |
| 2012/0130593 A1 * | 5/2012 | Davis | ..................... | B62D 1/28 701/41 |
| 2012/0151815 A1 * | 6/2012 | Tate | ..................... | F16M 11/041 42/90 |
| 2012/0232795 A1 * | 9/2012 | Robertson | .............. | G01C 21/00 701/532 |
| 2013/0013185 A1 * | 1/2013 | Smitherman | ........ | G01C 11/025 701/409 |
| 2014/0161273 A1 * | 6/2014 | Soufan | .................... | H04M 1/19 381/73.1 |
| 2014/0172200 A1 * | 6/2014 | Miralles | .................... | G05D 1/12 701/3 |
| 2016/0299506 A1 * | 10/2016 | Bruggeman | ........... | B64D 31/06 |
| 2018/0093755 A1 * | 4/2018 | Miralles | ................... | G05D 1/12 |

* cited by examiner

EFFICIENT AIRBORNE OBLIQUE IMAGE COLLECTION

The current application claims a priority to the U.S. Provisional Patent application Ser. No. 62/131,657 filed on Mar. 11, 2015.

FIELD OF THE INVENTION

The present invention is in the technical field of remote sensing. More particularly, the present invention is in the technical field of airborne digital oblique imagery collection for the purposes of creating dense three dimensional recreations of an overflown terrestrial scene.

BACKGROUND OF THE INVENTION

A conventional manned or unmanned airborne image collection system is comprised of a digital camera, flight management system (FMS), navigation subsystem, and image storage system. The nominally down looking image frames and the navigation data are processed together after the collection so as to provide a seamless mosaicked digital view of the overflown terrain that can be used in the same manner as a map. That is, the geodetic location on the earth surface for all features viewable on the digital presentation can be measured. This so-called ortho-registered mosaicked image is widely used for various engineering purposes as well as for raw material to derive digital maps showing roads, buildings, etc.

The trajectory most often used for the airborne image collection is a pattern of parallel lines. These parallel lines are purposefully laid out to achieve a prescribed image overlap both across the flight lines as well as down the flight lines. A traditional aerial imaging collection plan will lay down parallel flight lines to cover a user-prescribed polygon, where the flight line lateral separation is dictated by the desired sidelap and image resolution.

The post-processing of the image frames consists of Aerial Triangulation (AT) methods, where terrestrial objects viewable from multiple frames are used together with a math model of the camera view geometry and geodetic locations of image photo centers to derive the position and orientation of all collected frames. These geo-located frames can then be used to locate and measure common features visible in multiple frames. The geo-located aerial image frames from the AT might be stored in a database in a manner that a user can access all georegistered frames, wherein a common feature is visible. With these frames in hand, as well as the geodetic geometry of the frames from the AT, the common observable points can be defined in a three dimensional (3D) geodetic sense. Thus, for example, 3D building heights can be measured and the 3D structure of a roof can be measured.

The airborne imagery collection system can also be structured to collect highly oblique image frames rather than nominally down looking frames. For example, if separate cameras are used with views oriented to look forward, aft, right, left, and down (five separate cameras) then all sides of a vertical structure can be viewed when the aircraft covers an area with parallel flight lines. An alternate design might use right, left and down cameras and traverse the coverage in, for example, both a North-South and East-West direction. This alternative design results in a simpler camera design but requires two times the aircraft flight time.

Due to advances in digital cameras and data processing systems, the market for georegistered imagery has trended towards requirements for a more three-dimensional representation of the terrestrial features than is provided by the orthomosaic product. Efficient software methods are available where common features observed in multiple frames can be assigned in a highly dense fashion. As the density of the geo-located feature points is increased, and each such point is assigned a color from the collection of images, then a true 3D rendition of a scene can be stored in a manner so that it can be viewed from an arbitrary aspect using a software application. Such a dataset of colorized 3D points is called a point cloud. Various software viewers of such point clouds are available that include the ability to measure the geodetic location of visible features, and thus the relative locations of all observed points. The drawback in such point clouds is that when the viewpoint is moved too close to the points, then the sparsity of the points becomes obvious due to their distinct nature.

A better solution to the 3D surface representation is provided by identifying 3D points as in the point cloud, but treating these points as vertices of a planer facet. The 3D facet surface can then be assigned a color mapping from the imagery frames that completely fill the facet. If the imaged terrain surface is completely enclosed by these facets, then the distinct nature of the vertices is not evident with the viewer. Various applications are available today for viewing a 3D mesh of complex urban scenes. Also, various software applications are available for preparing the 3D surface mesh given a suitable set of overlapping oblique imagery.

Given that the 3D mesh is the preferred representation of a complex terrain surface, and that software applications are available for preparing and viewing these 3D meshes, it is desirable that airborne image collection methods be optimized for the preparation of these 3D meshes. The colorized facets of the 3D mesh take their color map from one of the collected images that is most parallel to the facet. Because the large number of 3D-defined facets can have arbitrary spatial orientation, it becomes important that the image collection be such that a high diversity of image position and orientation is provided by the collected digital image dataset. That is, images should be available that are approximately parallel to all of the generated 3D facets. This position and orientation diversity becomes even more important when such complex scenes as dense urban buildings are imaged causing extensive between-building areas that must be covered by multi-aspect imagery. The traditional imagery collection methods with parallel flight lines and individual oblique camera view aspects are not ideally suited for the 3D mesh computations.

The proposed innovation is to use an airborne data collection trajectory formed by a series of overlapping circling patterns that more completely fills the area of desired coverage with multi-aspect images. Given the radius of the circle and the aircraft height above the terrain features, a desired camera orientation angle in relation to the aircraft body axes can be defined to obtain the desired multi-aspect coverage within any individual circle. By capturing the images around the circle at a high data rate and by causing the view coverage to overlap the center of the circle, a dense set of images can be collected with the desired view orientation diversity. By causing the aircraft to fly a sequence of adjacent overlapping circles, a polygon of arbitrary size and shape can be covered.

One benefit of this approach is that an extremely dense and diverse set of imaging orientations over an area are achieved for use in 3D mesh facet color mapping. Also, the high degree of image overlap from multiple directions aids in improving the reliability of the feature matching and the accuracy of the 3D feature position computation. Also, the camera design can be simplified because all the cardinal oblique angles are not required to be collected simultaneously. Finally, the off-nadir oblique aspect of individual camera frames can be much higher than for traditional multi-camera oblique systems because the aircraft banking is used to assist in achieving the oblique camera view aspect.

The key system design components for the proposed imagery collection solution are: the design of the digital camera system, the angle of the camera view aspect relative to the aircraft body axes, and the flight management system that is used to provide feedback to the pilot (or autopilot for unmanned systems) to manage the sequence of encircling trajectory elements.

DETAIL DESCRIPTIONS OF THE INVENTION

Figure 1:
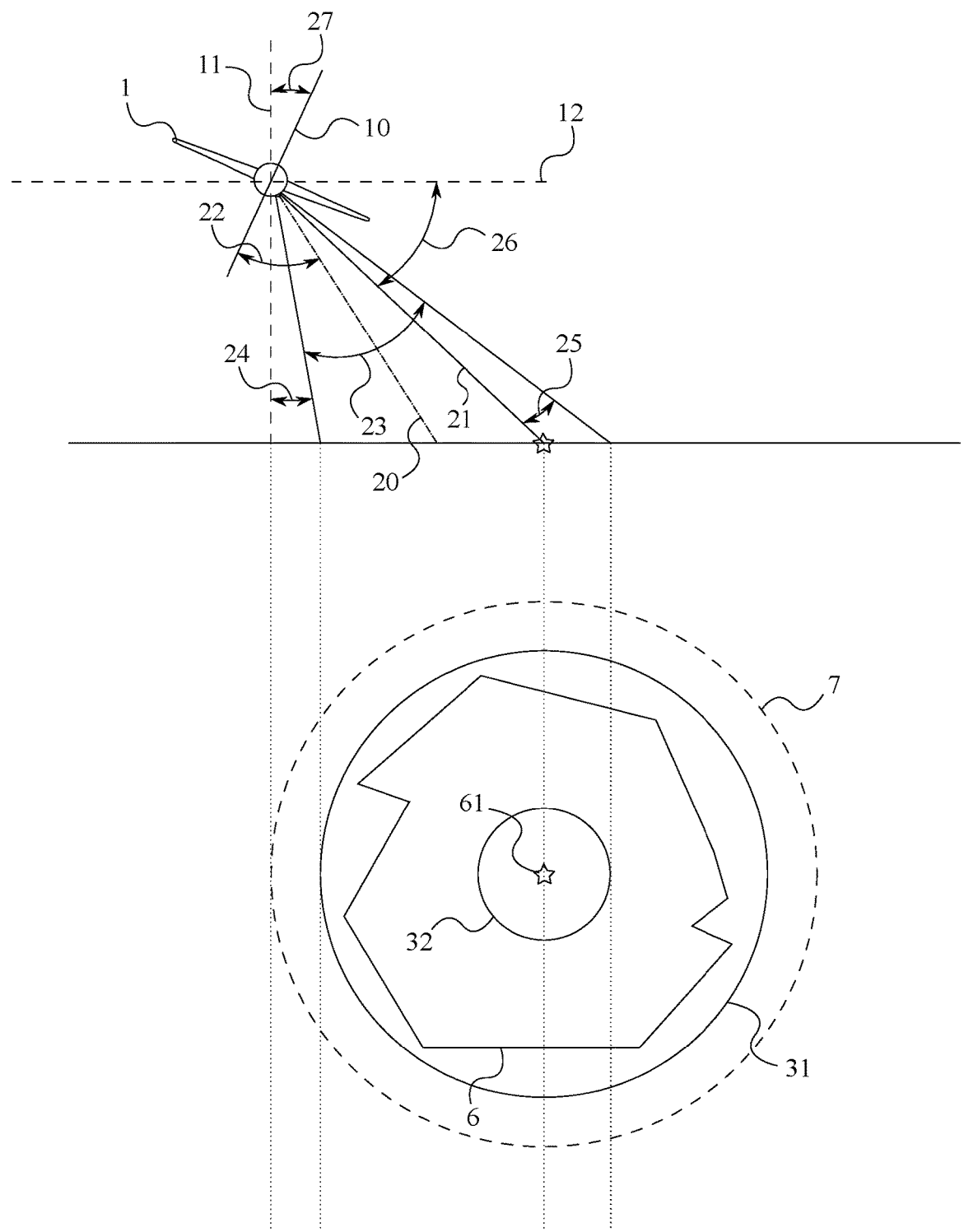
FIG. 1 is a diagram depicting the proposed camera and aircraft geometry in relation to the subtended scene, wherein the radial trajectory is a single circle and the focal point is fixed.

All illustrations of the drawings are for the purpose of describing selected versions of the present invention and are not intended to limit the scope of the present invention.

The present invention is a system and method for airborne oblique image collection that provides a dense diversity of view aspects of a subtended scene. An aircraft 1, being either manned or unmanned, is maneuvered along a prescribed trajectory over a targeted observable region 6, wherein the aircraft 1 comprises an onboard camera 2 for collecting image frames of the subtended scene. The image frames taken along the prescribed trajectory cover the subtended scene, such that all vertical terrain features of the subtended scene are observed multiple times with large variations in the positions and orientations of the image plane of the onboard camera 2. Once the image frames are collected using the onboard camera 2, the image frames are utilized to prepare a dense three dimensional mesh that describes the surface of the subtended scene.

The prescribed trajectory and the orientation of the onboard camera 2 with respect to a yaw axis 10 of the aircraft 1 are preplanned using governing camera view mathematics and knowledge of the dynamic constraints of the aircraft 1. The prescribed trajectory is more specifically a radial trajectory 7, wherein the radial trajectory 7 allows for the more complete coverage of terrain features than traditional linear flight patterns. Additionally, the implementation of the radial trajectory 7 reduces the number of cameras needed to observe the subtended scene.

In reference to FIG. 1, the aircraft 1 is flown at an altitude, h, above the targeted observable region 6, wherein the onboard camera 2 is positioned to view the interior area of the radial trajectory 7. The onboard camera 2 has a fixed field-of-view angle 23, FOV, and a boresight 20 (lens axis direction) oriented at a camera tilt angle 22, $\tau$, with respect to the yaw axis 10 of the aircraft 1. For the radial trajectory 7 being a single circle, the aircraft 1 is intended to maintain an expected bank angle 27, $\beta$, in order to generate a lateral force, such that the dynamics of the aircraft 1 result in a circle having an expected radius, R, under the assumption of no wind.

In further reference to FIG. 1, throughout the radial trajectory 7, the boresight 20 is fixated around a focal point 61 of the targeted observable region 6. A focal line 21 is offset from the boresight 20, wherein the focal line 21 traverses from the onboard camera 2 to the focal point 61. The focal line 21, along with the forward edge of the field-of-view angle 23, is utilized to define a redundant coverage area 32 observed by the onboard camera 2. The redundant coverage area 32 overlaps a primary coverage area 31 observed by the onboard camera 2, wherein the primary coverage area 31 provides a majority of the area that is observed by the onboard camera 2.

To determine the camera tilt angle 22 needed to provide full coverage of the interior of the radial trajectory 7, other geometries of the onboard camera 2 must be considered in addition to the field-of-view angle 23; namely an aft angle 24, a forward edge angle 25, and a focal line angle 26. In reference to FIG. 1, the forward edge angle 25, $\delta$, defines the orientation of the forward edge of the field-of-view angle 23 relative to the focal line 21, while the focal line angle 26, $\gamma$, defines the orientation of the focal line 21 relative to a horizontal axis 12; the horizontal axis 12 being parallel to the subtended scene. Meanwhile, the aft edge angle 24, $\phi$, defines the orientation of the aft edge of the field-of-view angle 23 relative to a vertical axis 11; the vertical axis 11 being perpendicular to the subtended scene.

It is desirable to understand the relationship amongst the field-of-view angle 23, the aft edge angle 24, the forward edge angle 25, and the focal line angle 26 so that the altitude, the expected radius, and the camera tilt angle 22 can be defined to achieve the best desirable image resolution and the maximum coverage area. The first geometrical constraint is expressed as follows:

$$\phi + FOV - \beta + \gamma = 90 \qquad (1)$$

The aft edge angle 24 and the forward edge angle 25 are pre-defined according to the desired image collection qualities. It is desirable that the forward edge angle 25 be small and positive in order to insure the center portion of the radial trajectory 7 is repetitiously covered, forming the redundant coverage area 32 and allowing for some degree of bank angle variation due to wind and pilot steering variations. Also, the aft edge angle 24 is preferably small so that all features within the circle coverage area are viewed from a near vertical aspect.

Using the defined values for the field-of-view angle 23, the aft edge angle 24, and the forward edge angle 25, the value for the focal line angle 26 can be calculated using equation (1). The focal line angle 26 is then used in conjunction with the altitude to determine the expected radius. Using the geometric constraints of the right triangle formed between the altitude, the expected radius, and the focal line 21, the following equation is used to obtain the value for the expected radius:

$$R = \frac{h}{\tan(\gamma)} \quad (2)$$

The altitude is dependent in part on the design and constraints of the aircraft 1. However, it is desirable that the altitude be as low as possible so that the ground sample distance (GSD) of the imagery taken by the onboard camera 2 be as fine as possible. It is also understood that a finer GSD will lead to less area coverage per unit time.

For coordinated aircraft flight, the acceleration vector of the aircraft 1 must be perpendicular to the wings of the aircraft 1. Also, the aircraft 1 speed while traversing the radial trajectory 7 induces a horizontal centripetal force that must be countered by an acceleration generated from the expected bank angle 27. This produces the following relationship, which can be used to determine a value for the expected bank angle 27 given an expected velocity, V, of the aircraft 1 and the expected radius determined in equation (2):

$$\tan(\beta) = \frac{V^2}{RG} \quad (3)$$

In equation (3), G is the value for gravitational acceleration.

Once the expected bank angle 27 has been determined, the camera tilt angle 22 can finally be calculated using the following equation:

$$\tau = \frac{FOV}{2} + \beta + \phi \quad (4)$$

The calculations in equations (1)-(4) can be carried out for a number of values for the expected velocity, the altitude, the aft edge angle 24, and the forward edge angle 25 in order to optimize the radial trajectory 7 over the targeted observable region 6. Table 1 provides a set of geometric data based upon the relationships in equations (1)-(4), wherein Table 1 assumes a value of 60 degrees for the field-of-view angle 23, a value of 80 knots for the expected velocity, and a value of 2 degrees for the forward edge angle 25.

TABLE 1

Circling aircraft geometry parameters for efficient oblique coverage

| Altitude (feet) | φ (degrees) | R (feet) | β (degrees) | τ (degrees) |
|---|---|---|---|---|
| 500 | 0 | 800 | 35 | 65 |
| 500 | 10 | 1237 | 22 | 64 |
| 1000 | 0 | 1600 | 19 | 49 |
| 1000 | 10 | 2475 | 13 | 53 |
| 1500 | 0 | 2400 | 13 | 43 |
| 1500 | 10 | 3712 | 9 | 49 |

Notable from Table 1, the field-of-view angle 23 having a value of 60 degrees will provide oblique angles from 0-60 degrees and 10-70 degrees relative to the vertical axis 11 for the aft edge angle 24 having a value of 0 degrees and 10 degrees respectively. The altitude having a value of 500 feet may be suitable for the aircraft 1 being unmanned or for a low-speed aircraft, such as a helicopter or gyrocopter. Meanwhile, the altitude having a value of 1000 feet or 1500 feet can be accomplished with the aircraft 1 being either manned or unmanned, and present a large range of values for the expected radius. As previously stated, a larger value for the expected radius results in the coverage of more area within a given flight time. The values for the expected bank angle 27 can be achieved by the aircraft 1 being either manned or unmanned.

Once the parameters for the aircraft 1 and the onboard camera 2 have been set, the radial trajectory 7 is plotted over the targeted observable region 6, wherein the radial trajectory 7 is plotted around the focal point 61, as depicted in FIG. 1. The position of the focal point 61 may be fixed or linearly variable depending on the size of the targeted observable region 6 and the value of the expected radius. If the expected radius is large enough to encompass the entirety of the targeted observable region 6, then a single circle pattern is sufficient for the radial trajectory 7, wherein the focal point 61 is fixed in one position throughout the entirety of the radial trajectory 7.

Figure 2:
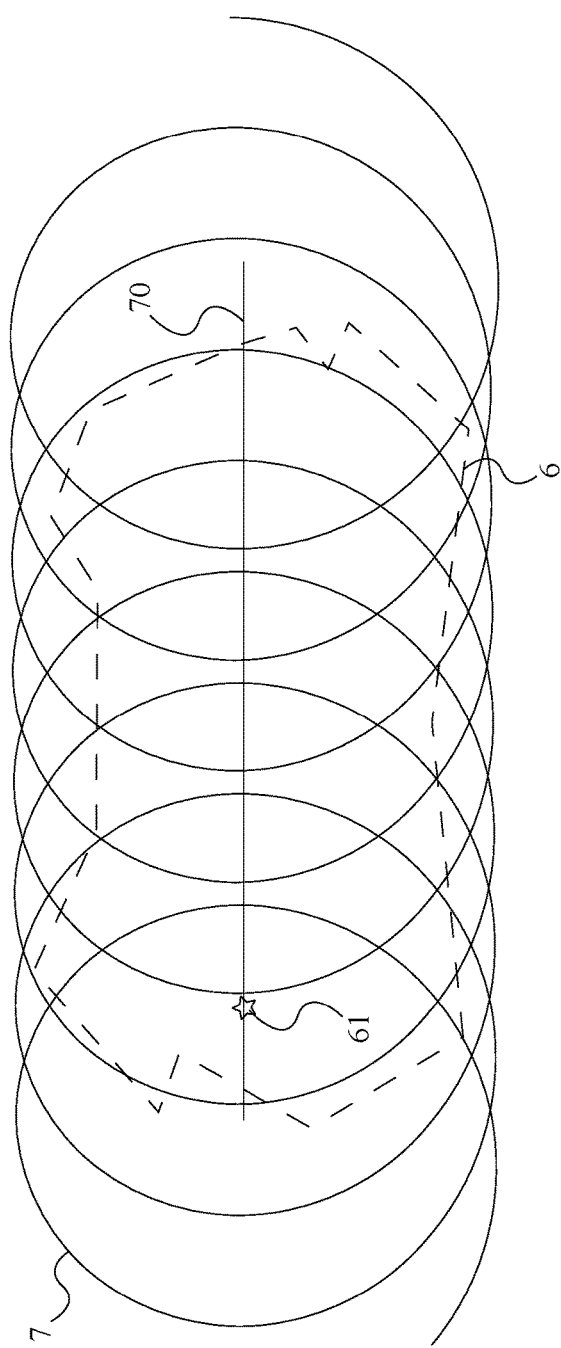
FIG. 2 is a diagram showing the radial trajectory being an overlapping looping pattern, wherein the focal point is linearly variable along the linear path.

In reference to FIG. 2, if the expected radius is not large enough to fully encompass the targeted observable region 6, then an overlapping looping pattern is employed for the radial trajectory 7. The overlapping looping pattern is formed by multiple overlapping circles that are positioned along a linear path 70 that traverses across the targeted observable region 6. Using the overlapping looping pattern, the focal point 61 traverses along the linear path 70 throughout the radial trajectory 7. The rate at which each circle in the overlapping looping pattern is traversed can be used to govern the degree of circle overlap.

In some cases, the targeted observable region 6 may be so large that a subsequent radial trajectory 8 is required in order to provide full coverage of the targeted observable region 6. The subsequent radial trajectory 8 is plotted using the same value for the expected radius as is used for the radial trajectory 7, and the subsequent radial trajectory 8 is plotted such that the subsequent radial trajectory 8 overlaps the radial trajectory 7. Similar to the radial trajectory 7, the subsequent radial trajectory 8 is plotted around a subsequent focal point 62, wherein position of the subsequent focal point 62 can be either fixed or linearly variable.

Figure 3:
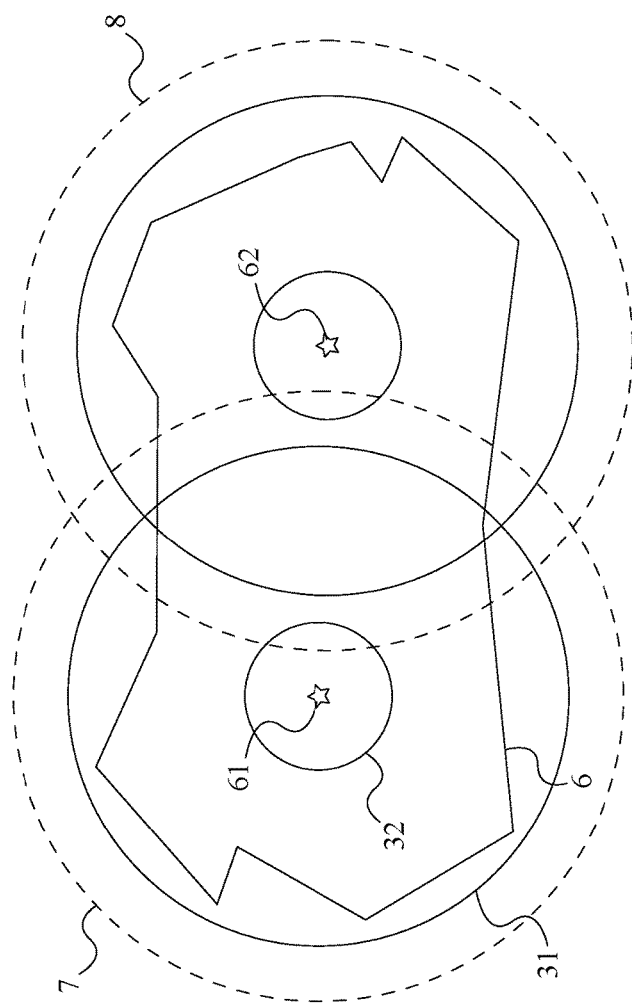
FIG. 3 is a diagram showing a subsequent radial trajectory overlapping the radial trajectory in order to cover the targeted observable region, wherein the subsequent focal point is fixed.

In reference to FIG. 3, in one embodiment, the focal point 61 and the subsequent focal point 62 are fixed in a grid like manner, wherein the radial trajectory 7 and the subsequent radial trajectory 8 are plotted as single, overlapping circles. Additional trajectories and focal points may be plotted as needed in order to provide complete coverage of the targeted observable region 6. The additional trajectories and focal points are plotted in a manner such that the resulting overlapped circles are able to accommodate the targeted observable region 6 being any arbitrary size and shape.

Figure 4:
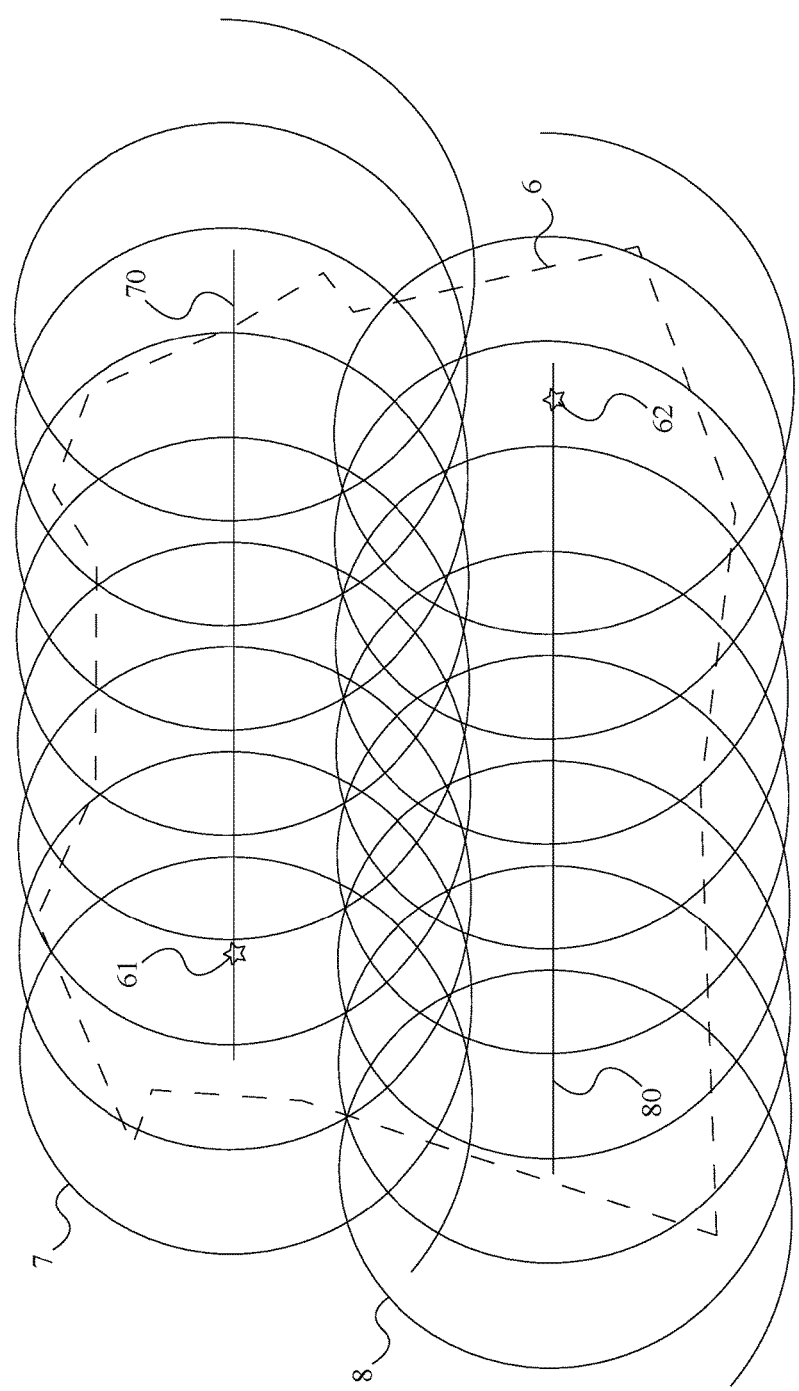
FIG. 4 is a diagram showing the subsequent radial trajectory overlapping the radial trajectory, wherein the subsequent radial trajectory is an overlapping looping pattern and the subsequent focal point is linearly variable along the subsequent linear path.

In reference to FIG. 4, in another embodiment, the position of both the focal point 61 and the subsequent focal point 62 is linearly variable, wherein an overlapping looping pattern is employed for both the radial trajectory 7 and the subsequent radial trajectory 8. The overlapping looping pattern of the radial trajectory 7 is positioned along the linear path 70 that traverses across the targeted observable region 6. Similarly, the overlapping looping pattern of the subsequent radial trajectory 8 is positioned along a subsequent linear path 80 that traverses across the targeted observable region 6. Using the overlapping looping pattern, the focal point 61 traverses along the linear path 70 throughout the radial trajectory 7, while the subsequent focal point 62 traverses along the subsequent linear path 80 throughout the subsequent radial trajectory 8.

Using multiple trajectories and focal points, the mission planner is able to select the desired degree of circle overlap in two directions. All of the circles will have a constant radius and will be flown at a constant altitude above the ground. Furthermore, the radius of each of the circles will be prescribed by the desired flying altitude and the constraints of the onboard camera 2 as exemplarily displayed in Table 1 and equations (1)-(4).

The onboard camera 2 can be designed with consideration to the type of imagery collection trajectory described above. A suitable camera structural mounting method must be designed for the onboard camera 2, such that there is no view blockage from structural components of the aircraft 1. For applications that require minimally modifying an existing aircraft, this may require externally mounting a camera pod to the pilot entry step or the wing strut. The onboard camera 2 being internally mounted to the aircraft 1, looking through a belly hole, may be problematic because of the requirement for rolling the view aspect of the onboard camera 2 about the roll axis of the aircraft 1.

It is desirable that image frames be taken rapidly to ensure a dense set of coverage angles. Furthermore, it is important that the field-of-view angle 23 is large (e.g. 60 degrees) to ensure that oblique angles span a large range, diverging outward from the aircraft 1. However, the field-of-view angle 23 being significantly larger than 60 degrees will not pay significant benefit because the near-horizontal camera views may see little of the targeted observable region 6. The along-track field-of-view does not have to be large provided the frame sample time is sufficiently large to ensure some degree of overlap as the aircraft 1 rotates around the targeted observable region 6.

In alternative embodiments of the present invention, it is possible for a plurality of onboard cameras to be utilized to obtain the desired oblique angles. Each of the plurality of onboard cameras is mounted such that the boresight 20 of each of the plurality of onboard cameras is parallel and spread such that the combined cross-track field-of-view is much larger than the along-track field-of-view. For example, two digital single-lens reflex (DSLR) cameras, each with a 4:3 pixel array aspect ratio might be used to provide a combined imaging array having an 8:3 pixel array aspect ratio with the longer side of the combined imaging array used to achieve the large spread of oblique angles. In one proposed embodiment, two DSLR cameras, each with a 30 degree cross-track field-of-view, are connected so as to establish the desired 60 degree aspect.

Figure 5:
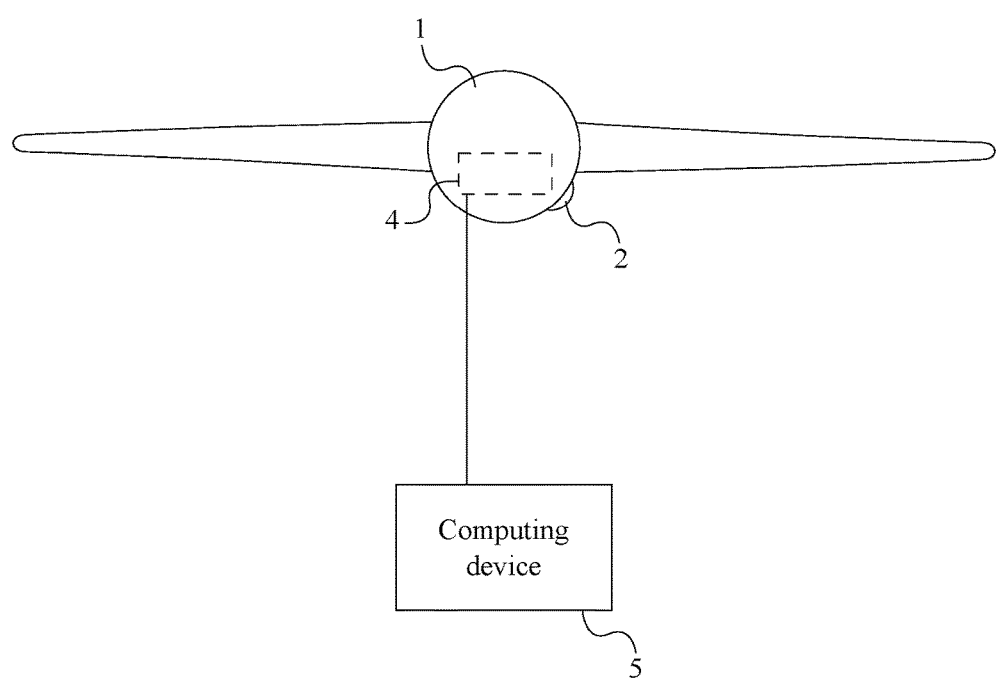
FIG. 5 is a diagram depicting the communication between the computing device and the flight management system in order to upload the radial trajectory to the flight management system.

A flight management system 4 is integrated into the aircraft 1 and enables a pilot (or autopilot) to adhere to the radial trajectory 7 while flying. The flight management system 4 collects data pertaining to a current flight path of the aircraft 1 and analyzes the data to generate a predicted location for the aircraft 1. The predicted location is then compared to an expected location for the aircraft 1 along the radial trajectory 7. In order to compare the predicted location to the expected location along the radial trajectory 7, the radial trajectory 7 must first be uploaded to the flight management system 4 from a computing device 5. The computing device 5 can be wirelessly connected to the flight management system 4 or connected to the flight management system 4 via a wired connection, as depicted in FIG. 5. Once connected, the radial trajectory 7 is uploaded to the flight management system 4, wherein the flight management system 4 receives the radial trajectory 7 from the computing device 5.

Figure 10:
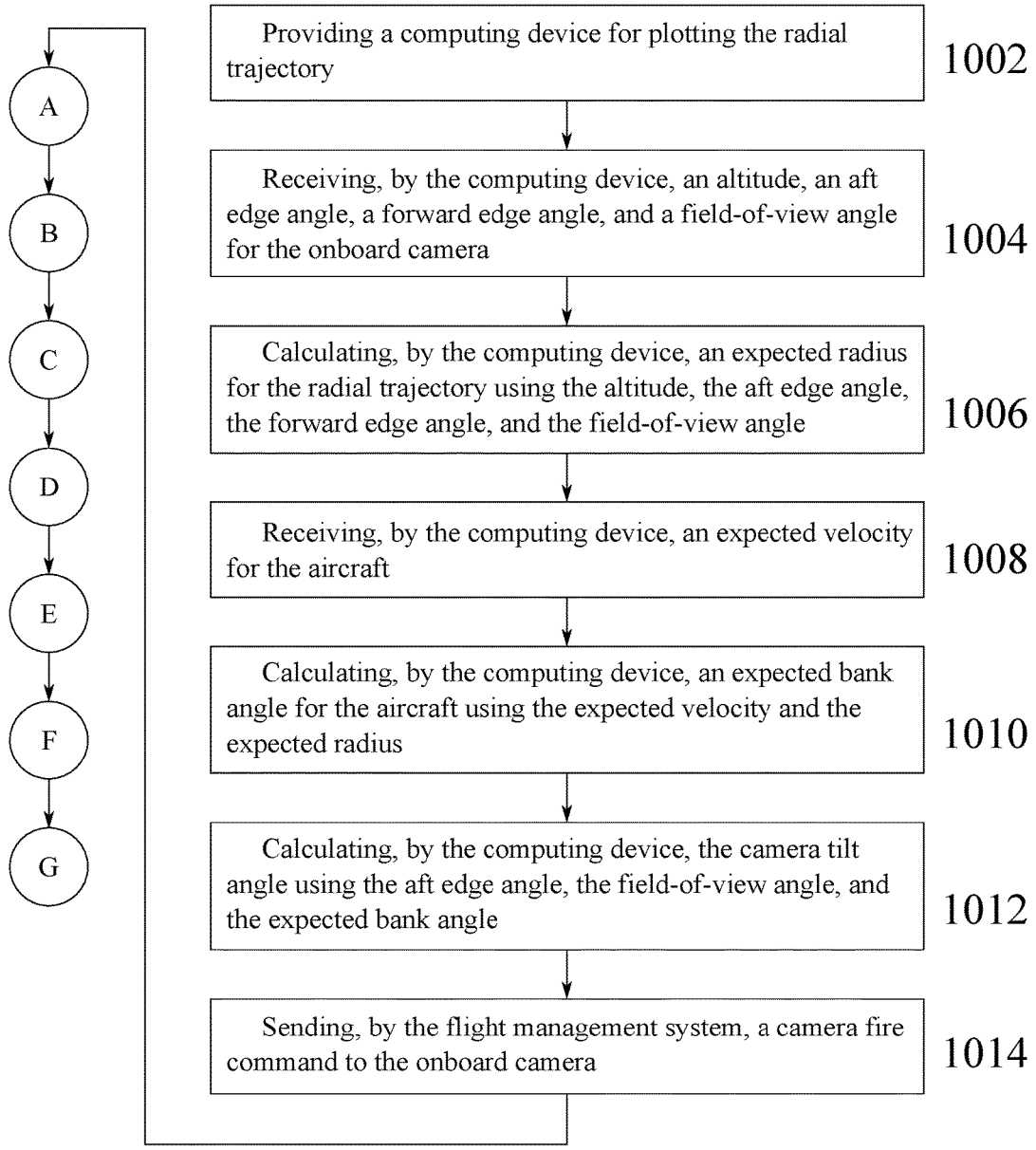
FIG. 10 is a flowchart thereof, further depicting steps for plotting the radial trajectory using a computing device and uploading the radial trajectory to the flight management system via the computing device.

In reference to FIG. 10, the computing device 5 can also be utilized to plot the radial trajectory 7 using inputs entered by the mission planner. More specifically, the computing device 5 receives the altitude, the aft edge angle 24, the forward edge angle 25, and the field-of-view angle 23 for the onboard camera 2 as inputs. The computing device 5 then calculates the expected radius for the radial trajectory 7 using equation (1) and equation (2). The computing device 5 also receives the expected velocity for the aircraft 1 as an input, wherein the computing device 5 calculates the expected bank angle 27 for the aircraft 1 using the expected velocity and the expected radius calculated in equation (2). Upon calculating the expected bank angle 27, the computing device 5 calculates the camera tilt angle 22 using the aft edge angle 24, the field-of-view angle 23, and the expected bank angle 27 according to equation (4). The computing device 5 can then be utilized to select the focal point 61 of the targeted observable region 6, wherein the radial trajectory 7 is plotted about the focal point 61 using the calculated parameters.

With the radial trajectory 7 uploaded to the flight management system 4, the aircraft 1 is prepped to collect the image frames of the targeted observable region 6. In reference to FIG. 6, the aircraft 1 navigates the radial trajectory 7 over the targeted observable region 6, wherein the aircraft 1 fixates the boresight 20 of the onboard camera 2 about the focal point 61 of the targeted observable region 6 throughout the radial trajectory 7. As the aircraft 1 traverses along the radial trajectory 7, the onboard camera 2 observes the primary coverage area 31 and the redundant coverage area 32 within the radial trajectory 7. The redundant coverage area 32 overlaps the primary coverage area 31 to account for trajectory errors and ensure that complete coverage of the targeted observable region 6 is provided; the size of the redundant coverage area 32 is defined by the forward edge angle 25.

Figure 9:
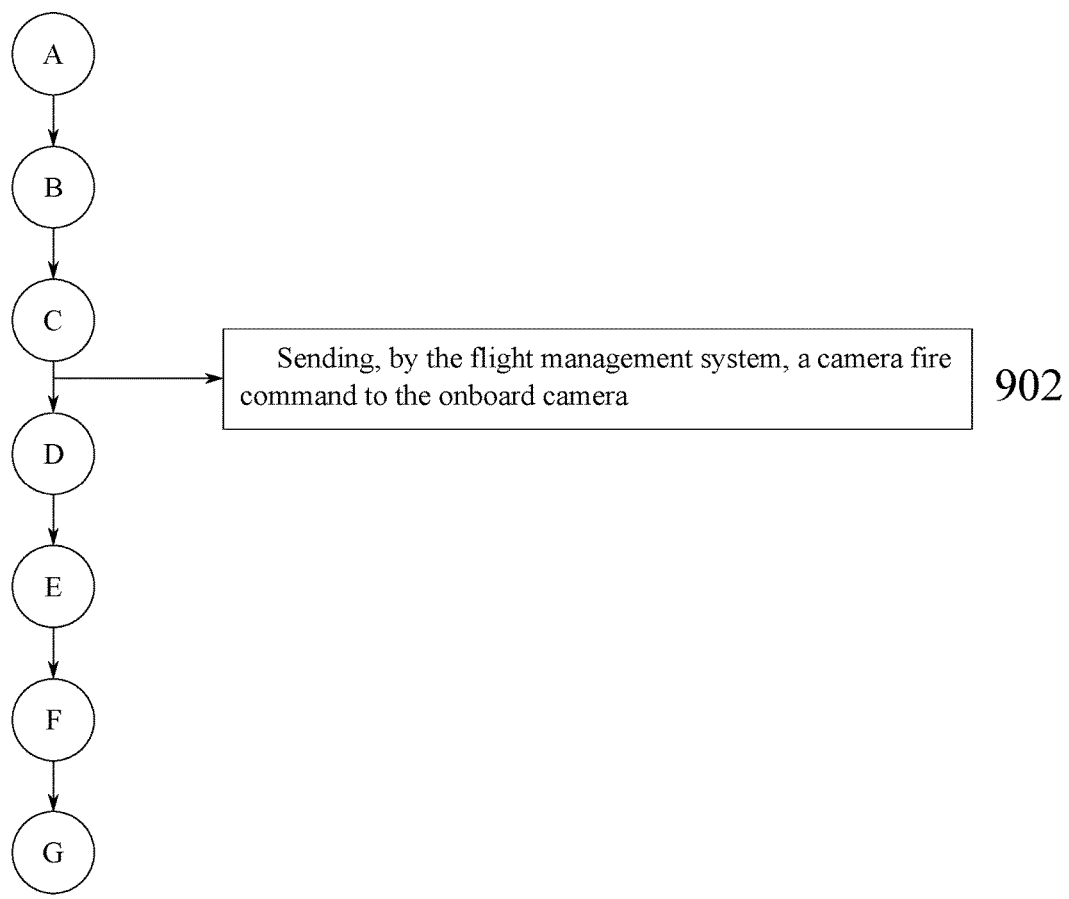
FIG. 9 is a flowchart thereof, further depicting the step for instructing the onboard camera to begin collecting the image frames of the targeted observable region.

In reference to FIG. 9, as the aircraft 1 traverses along the radial trajectory 7, the flight management system 4 sends a camera fire command to the onboard camera 2. Upon receiving the camera fire command, the onboard camera captures an image frame, or frames, of the targeted observable region 6. The camera fire command can be sent for each instance in which an image frame is to be captured by the onboard camera 2, or the camera fire command can instruct the onboard camera 2 to collect a series of image frames. Furthermore, the camera fire command can instruct the onboard camera 2 to collect image frames for a predefined period of time or until a kill command is subsequently sent from the flight management system 4 to the onboard camera 2.

Figure 7:
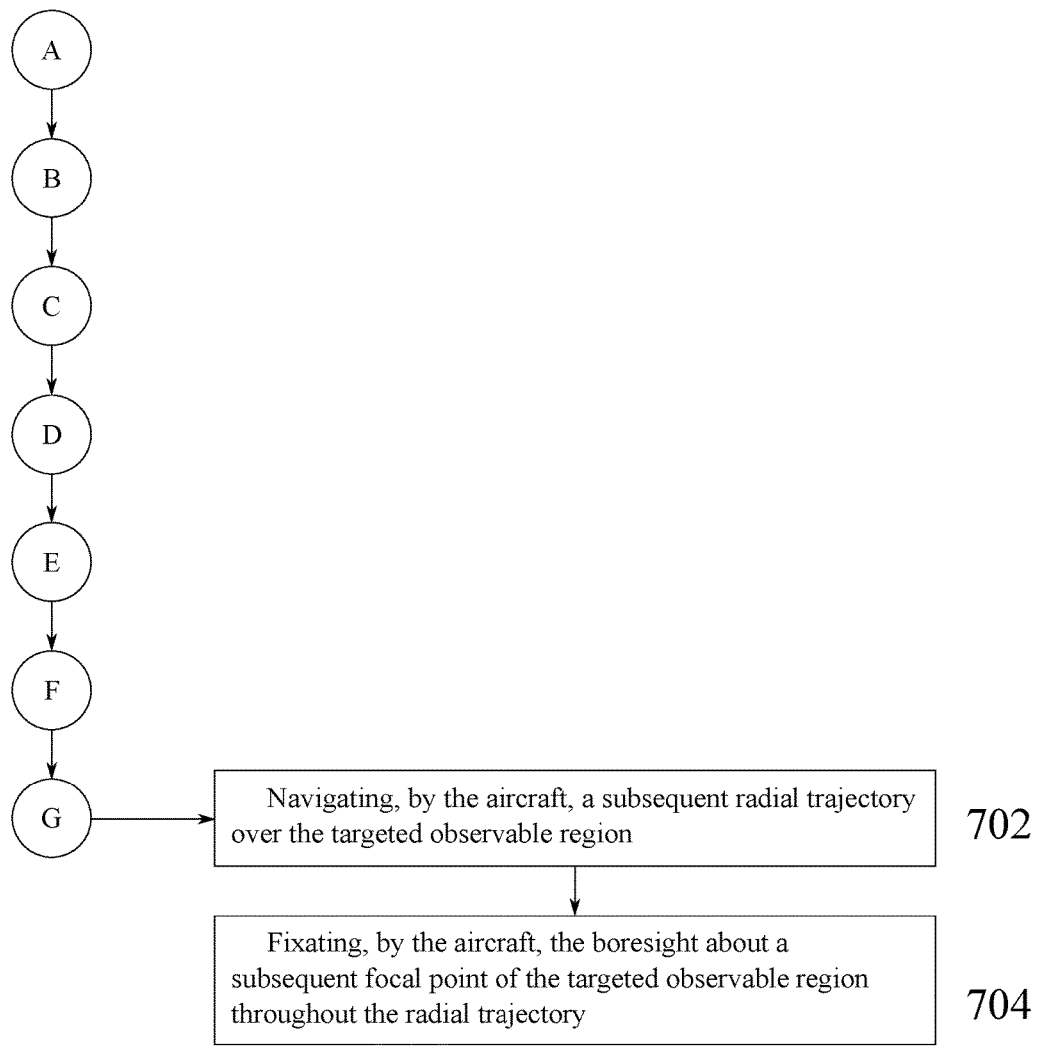
FIG. 7 is a flowchart thereof, further depicting steps for navigating the subsequent radial trajectory.

In reference to FIG. 7, if the subsequent radial trajectory 8 is required, then the aircraft 1 navigates the subsequent radial trajectory 8 over the targeted observable region 6 upon completing the radial trajectory 7. Throughout the subsequent radial trajectory 8, the aircraft 1 fixates the boresight 20 of the onboard camera 2 about the subsequent focal point 62 of the targeted observable region 6. As the aircraft 1 traverses along the radial trajectory 7, the onboard camera 2 observes a primary coverage area 31 and a redundant coverage area 32 within the subsequent radial trajectory 8.

Figure 6:
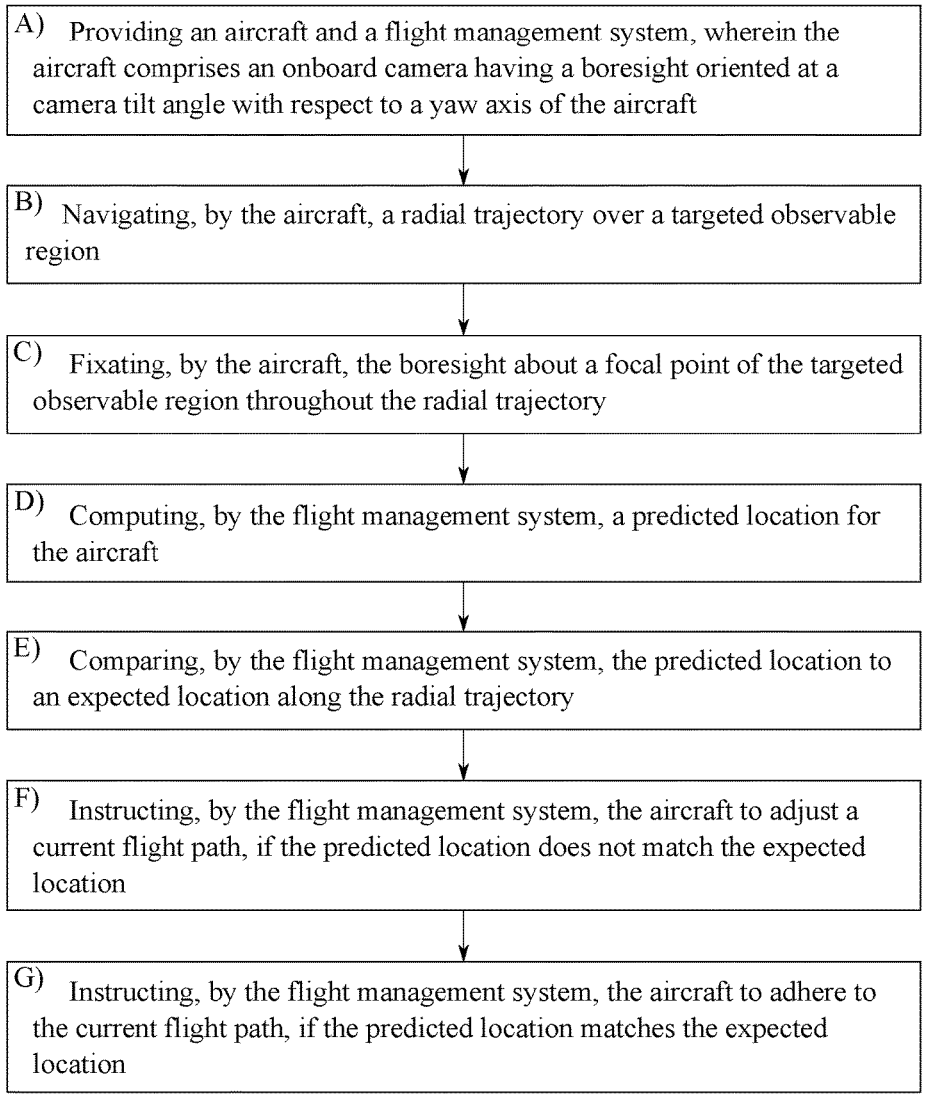
FIG. 6 is a flowchart depicting the steps for collecting oblique angle images of the targeted observable region.

In reference to FIG. 6, as the aircraft 1 navigates the radial trajectory 7, the flight management system 4 computes the predicted location of the aircraft 1, and compares the predicted location to the expected location along the radial trajectory 7. If the predicted location does not match the expected location, then the flight management system 4 instructs the aircraft 1 to adjust the current flight path. Meanwhile, if the predicted location matches the expected location, then the flight management system 4 instructs the aircraft 1 to adhere to the current flight path. To calculate the predicted location, the flight management system 4 assumes that a bank angle of the aircraft 1 remains constant.

The aircraft 1 being at constant altitude and undergoing a constant turn radius can be modeled using the following equations:

$$\frac{dX}{dt} = V\cos(\psi) \quad (5)$$

$$\frac{dY}{dt} = V\sin(\psi) \quad (6)$$

$$\frac{d\psi}{dt} = -\frac{V}{R} \quad (CCW \text{ circle rotation}) \quad (7)$$

In equation (5) and equation (6), X and Y are the coordinates for the position of the aircraft 1 in an orthogonal earth-fixed coordinate system. Meanwhile, in equations (5)-(7), V is a current velocity of the aircraft 1 and ψ is the heading of the aircraft 1. In equation (7), R is the radius of the turn. The aircraft 1 must traverse the radial trajectory 7 is a specific rotational direction, depending on the position of the onboard camera 2. For example, if the onboard camera 2 is located on the left side of the aircraft 1, then the plane must bank to the left so that the onboard camera 2 is directed towards the focal point 61. A bank to the left suggests a counter-clockwise rotation, thus the negative sign used in equation (7). For an aircraft 1 bank to the right (i.e. camera looking to the right), the sign in equation (7) would be positive.

Because the heading rate of the aircraft 1 is constant for a constant bank angle, the location of the aircraft 1 at a future time can be expressed using the following equations:

$$X(t+\Delta T) = X(t) + \int_0^{\Delta T} V\cos\left(\psi_0 - \frac{V}{R}t\right)dt \quad (8)$$

Integrating equation (8) and equation (9) yields:

$$X(t+\Delta T) = X(t) - R\left(\sin\left(\psi_0 - \frac{V}{R}\Delta T\right) - \sin(\psi_0)\right) \quad (10)$$

$$Y(t+\Delta T) = Y(t) + R\left(\cos\left(\psi_0 - \frac{V}{R}\Delta T\right) - \cos(\psi_0)\right) \quad (11)$$

Although equation (10) and equation (11) are valid, more information is required to perform the prediction. The aircraft 1 will be assumed to have a global positioning system (GPS) receiver that only provides the geodetic position (X, Y) and the current velocity (dX/dt, dY/dt). Therefore the second derivations of equation (10) and equation (11) will be approximated as follows:

$$\ddot{X} \approx \left(\frac{dX}{dt}(t+\delta t) - \frac{dX}{dt}(t)\right)/\delta t \quad (12)$$

$$\ddot{Y} \approx \left(\frac{dY}{dt}(t+\delta t) - \frac{dY}{dt}(t)\right)/\delta t \quad (13)$$

In equation (12) and equation (13), $\ddot{X}$ and $\ddot{Y}$ are approximations to the lateral accelerations based upon a divided difference formulation or some other method for computing the accelerations from the current velocity. The instantaneous trajectory curvature, $R_C$, is given by:

$$R_C = \frac{V^2}{A} \quad (14)$$

In equation (14), A is the approximate lateral acceleration under the assumption that the aircraft 1 is in a circle maneuver. Using only the GPS derived data:

$$V = \sqrt{\left(\frac{dX}{dt}\right)^2 + \left(\frac{dY}{dt}\right)^2} \quad (15)$$

$$A = \sqrt{\ddot{X}^2 + \ddot{Y}^2} \quad (16)$$

The heading for the aircraft 1 is given by:

$$\psi = \tan^{-1}\left(\frac{dY}{dt} \bigg/ \frac{dX}{dt}\right) \quad (17)$$

Equations (15)-(17) are suitable for computing the predicted location of the aircraft 1 using only the GPS positions and the current velocity, where the prediction assumes that the bank angle is held constant over the prediction window. A predict-ahead value of 10 seconds has been shown to give good results for the aircraft 1 being both manned and unmanned. A predicted radius from the focal point 61 using the predict-ahead time is given by:

$$R_{pred} = \sqrt{(X(t+\Delta T)-X_C)^2 + (Y(t+\Delta T)-Y_C)^2} \quad (18)$$

In equation (18), ($X_C$, $Y_C$) is the coordinates for the focal point 61 prescribed by the mission plan for the radial trajectory 7. For the radial trajectory 7 being a single circle, the values for the coordinates ($X_C$, $Y_C$) are constant for each prediction. All of the above expressions remain valid for the radial trajectory 7 being an overlapping looping pattern, wherein the focal point 61 moves along the linear path 70. The requirement for defining this encircling coverage is the current velocity and the location of the aircraft 1, the start and end point of the linear path 70 for the focal point 61, and the rate of change of the focal point 61 along the linear path 70.

Figure 8:
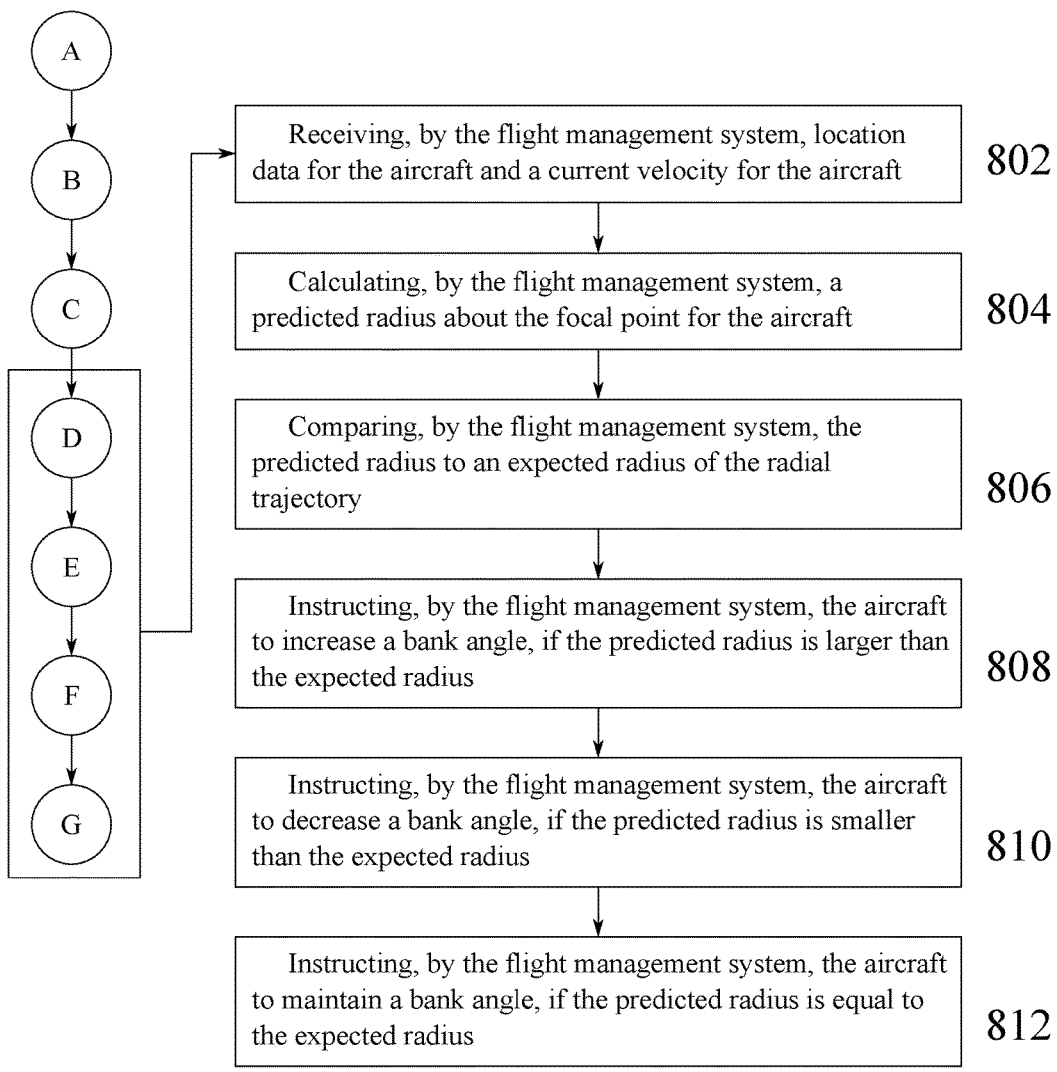
FIG. 8 is a flowchart thereof, expanding on the steps D-G used to maintain the aircraft on the radial trajectory.

In reference to FIG. 8, the flight management system 4 receives location data for the aircraft 1 and the current velocity of the aircraft 1 from the GPS receiver of the aircraft 1. Using the location data and the current velocity, the flight management system 4 calculates the predicted radius about the focal point 61 for the aircraft 1. The flight management system 4 then compares the predicted radius to the expected radius of the radial trajectory 7. If the predicted radius is larger than the expected radius, then the flight management system 4 instructs the aircraft 1 to increase the bank angle. If the predicted radius is smaller than the expected radius, then the flight management system 4 instructs the aircraft 1 to decrease the bank angle. If the predicted radius is equal to the expected radius, then the flight management system 4 instructs the aircraft 1 to maintain the bank angle.

Figure 11:
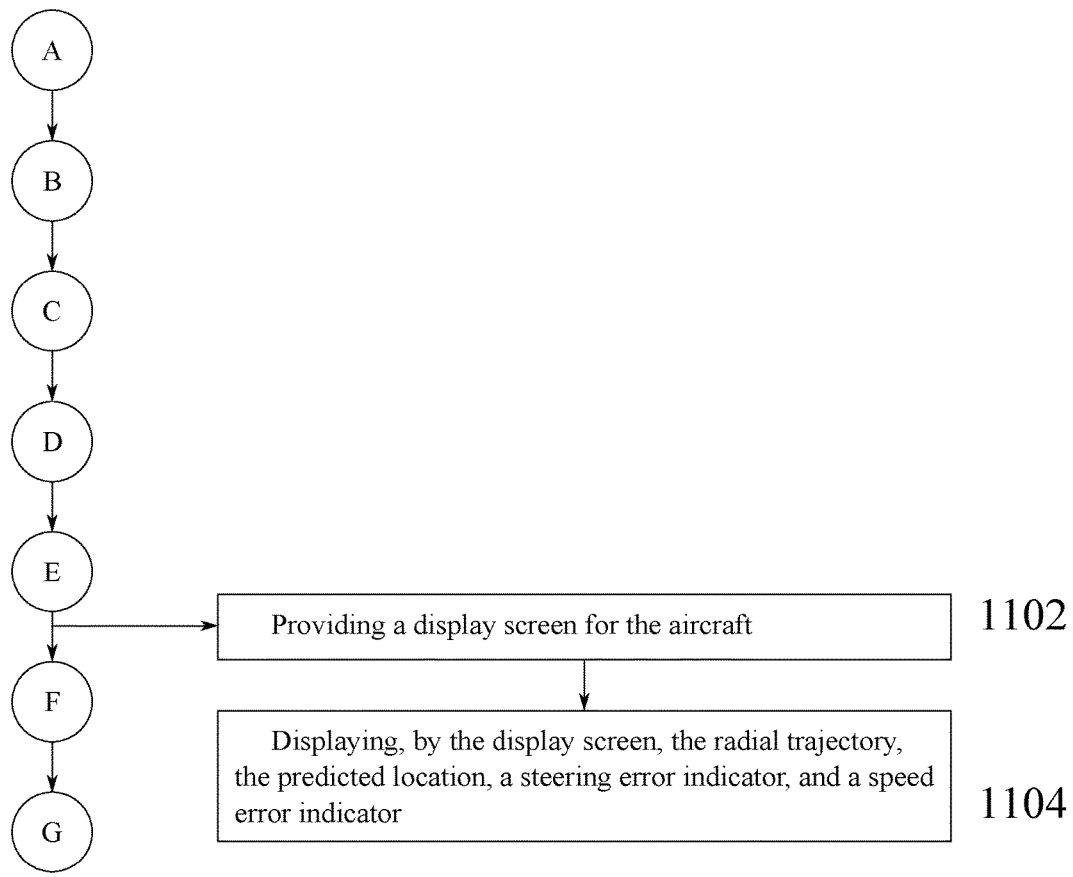
FIG. 11 is a flowchart thereof, further depicting steps for displaying flight parameters to the pilot through a display screen.

In reference to FIG. 11, for the aircraft 1 being piloted, the aircraft 1 comprises a display screen that is used to project data to the pilot in regards to the predicted location and the expected location of the aircraft 1. More specifically, the display screen displays the radial trajectory 7, the predicted location, a steering error indicator, and a speed error indicator. The radial trajectory 7 and the predicted location are projected over a map background of the targeted observable region 6, wherein the predicted location is updated by the flight management system 4. The deviation of the predicted location from the radial trajectory 7 provides a visualization of the error trend of the aircraft 1 relative to the radial trajectory 7. The pilot can then use the visual overlay of the predicted location and the radial trajectory 7 to adjust the bank angle as needed.

The steering error indicator is presented alongside the display of the predicted location and the radial trajectory 7. The steering error indicator compares the bank angle of the aircraft 1 to the expected bank angle 27 for the aircraft 1. In the preferred embodiment, the steering error indicator displays the difference between the bank angle and the expected bank angle 27. Using coordinated turn maneuvers, the pilot can then maintain the steering error indicator at zero. Alternatively, the steering error indicator can display both the bank angle and the expected bank angle 27, wherein the pilot visually compares the bank angle to the expected bank angle 27. For situations with wind, the bank angle will vary from the expected bank angle 27 to some degree. However, because of the circular trajectory, the wind-induced bank variation will tend to self-compensate (for steady wind) with higher bank on the downwind side and lower bank on the upwind side of the circle.

Similar to the steering error indicator, the speed error indicator is presented alongside the display of the predicted location and the radial trajectory 7. The speed error indicator compares the current velocity of the aircraft 1 to the expected velocity of the aircraft 1. In the preferred embodiment, the speed error indicator displays the difference between the current velocity and the expected velocity, wherein the pilot can adjust the throttle accordingly in order to maintain the speed error indicator at zero. Alternatively, the speed error indicator can display both the current velocity and the expected velocity, allowing the pilot to visually compare the current velocity to the expected velocity.

Although the invention has been explained in relation to its preferred embodiment, it is to be understood that many other possible modifications and variations can be made without departing from the spirit and scope of the invention as hereinafter claimed.

What is claimed is:

1. A method for airborne oblique image collection comprising:
   providing a flight management system;
   providing an aircraft, the aircraft comprising an onboard camera having a boresight;
   navigating, by the aircraft, a first radial trajectory over a targeted observable region, the first radial trajectory being in a first overlapping looping pattern, the first overlapping looping pattern being formed by a plurality of first overlapping circles, each of the plurality of first overlapping circles comprising a first center, the plurality of first centers being positioned along a first linear path, the first linear path traversing across the targeted observable region;
   fixating, by the aircraft, the boresight about a first focal point of the targeted observable region throughout the first radial trajectory, the first focal point traversing along the first linear path throughout the first radial trajectory;
   sending, by the flight management system, a first camera fire command to the onboard camera;
   collecting, by the onboard camera, first image frames in response to the first camera fire command being sent to the onboard camera;
   sending, by the flight management system, a first camera kill command to the onboard camera;
   stop collecting, by the onboard camera, the first image frames in response to first the camera kill command being sent to the onboard camera;
   computing, by the flight management system, a first predicted location for the aircraft;
   comparing, by the flight management system, the first predicted location to a first expected location along the first radial trajectory;
   instructing, by the flight management system, the aircraft to adjust a first current flight path in response to the first predicted location not matching the first expected location;
   instructing, by the flight management system, the aircraft to adhere to the first current flight path in response to the first predicted location matching the first expected location;
   navigating, by the aircraft, a second radial trajectory over the targeted observable region, the second radial trajectory being in a second overlapping looping pattern, the second overlapping looping pattern being formed by a plurality of second overlapping circles, each of the plurality of second overlapping circles comprising a second center, the plurality of second centers being positioned along a second linear path, the second linear path traversing across the targeted observable region, the first radial trajectory and the second radial trajectory overlapping each other, the first linear path and the second linear path being parallel to each other;
   fixating, by the aircraft, the boresight about a second focal point of the targeted observable region throughout the second radial trajectory, the second focal point traversing along the second linear path throughout the second radial trajectory;
   sending, by the flight management system, a second camera fire command to the onboard camera;

collecting, by the onboard camera, second image frames in response to the second camera fire command being sent to the onboard camera;

sending, by the flight management system, a second camera kill command to the onboard camera;

stop collecting, by the onboard camera, the second image frames in response to the second camera kill command being sent to the onboard camera;

computing, by the flight management system, a second predicted location for the aircraft;

comparing, by the flight management system, the second predicted location to a second expected location along the second radial trajectory;

instructing, by the flight management system, the aircraft to adjust a second current flight path in response to the second predicted location not matching the second expected location; and instructing, by the flight management system, the aircraft to adhere to the second current flight path in response to the second predicted location matching the second expected location.

2. The method for airborne oblique image collection as claimed in claim 1, wherein the onboard camera observes a first primary coverage area and a first redundant coverage area within the first radial trajectory and a second primary coverage area and a second redundant coverage area within the second radial trajectory.

3. The method for airborne oblique image collection as claimed in claim 1 comprising:

receiving, by the flight management system, a first location data for the aircraft and a first current velocity for the aircraft; and receiving, by the flight management system, a second location data for the aircraft and a second current velocity for the aircraft.

4. The method for airborne oblique image collection as claimed in claim 1 comprising:

calculating, by the flight management system, a first predicted radius about the first focal point for the aircraft;

comparing, by the flight management system, the first predicted radius to a first expected radius of the first radial trajectory;

instructing, by the flight management system, the aircraft to increase a first bank angle in response to the first predicted radius being larger than the first expected radius;

instructing, by the flight management system, the aircraft to decrease the first bank angle in response to the first predicted radius being smaller than the first expected radius;

instructing, by the flight management system, the aircraft to maintain the first bank angle in response to the first predicted radius being equal to the first expected radius;

calculating, by the flight management system, a second predicted radius about the second focal point for the aircraft;

comparing, by the flight management system, the second predicted radius to a second expected radius of the second radial trajectory;

instructing, by the flight management system, the aircraft to increase a second bank angle in response to the second predicted radius being larger than the second expected radius;

instructing, by the flight management system, the aircraft to decrease the second bank angle in response to the second predicted radius being smaller than the second expected radius; and instructing, by the flight management system, the aircraft to maintain the second bank angle in response to the second predicted radius being equal to the second expected radius.

5. The method for airborne oblique image collection as claimed in claim 1 comprising:

receiving, by the flight management system, the first radial trajectory from a computing device; and receiving, by the flight management system, the second radial trajectory from the computing device.

6. The method for airborne oblique image collection as claimed in claim 1 comprising:

providing a computing device for plotting the first radial trajectory and the second radial trajectory;

receiving, by the computing device, a first altitude, a first aft edge angle, a first forward edge angle and a first field-of-view angle for the onboard camera;

calculating, by the computing device, a first expected radius for the first radial trajectory using the first altitude, the first aft edge angle, the first forward edge angle and the first field-of-view angle;

receiving, by the computing device, a second altitude, a second aft edge angle, a second forward edge angle and a second field-of-view angle for the onboard camera; and calculating, by the computing device, a second expected radius for the second radial trajectory using the second altitude, the second aft edge angle, the second forward edge angle and the second field-of-view angle.

7. The method for airborne oblique image collection as claimed in claim 6 comprising:

receiving, by the computing device, a first expected velocity for the aircraft;

calculating, by the computing device, a first expected bank angle for the aircraft using the first expected velocity and the first expected radius;

calculating, by the computing device, a first camera tilt angle using the first aft edge angle, the first field-of-view angle and the first expected bank angle, the boresight being oriented at the first camera tilt angle with respect to a first yaw axis of the aircraft;

receiving, by the computing device, a second expected velocity for the aircraft;

calculating, by the computing device, a second expected bank angle for the aircraft using the second expected velocity and the second expected radius; and calculating, by the computing device, a second camera tilt angle using the second aft edge angle, the second field-of-view angle and the second expected bank angle, the boresight being oriented at the second camera tilt angle with respect to a second yaw axis of the aircraft.

8. The method for airborne oblique image collection as claimed in claim 1 comprising:

providing a display screen for the aircraft; and displaying, by the display screen, the first radial trajectory, the first predicted location, the second radial trajectory, the second predicted location, a steering error indicator and a speed error indicator.

9. The method for airborne oblique image collection as claimed in claim 8, wherein the steering error indicator compares a first bank angle for the aircraft to a first expected bank angle for the aircraft and compares a second bank angle for the aircraft to a second expected bank angle for the aircraft.

10. The method for airborne oblique image collection as claimed in claim 8, wherein the speed error indicator compares a first current velocity for the aircraft to a first expected velocity for the aircraft and compares a second current velocity for the aircraft to a second expected velocity for the aircraft.

* * * * *